B. R. SKINNER.
MEANS FOR HEATING BOILER FEED WATER.
APPLICATION FILED JUNE 8, 1918.
1,341,443.
Patented May 25, 1920.
5 SHEETS—SHEET 2.
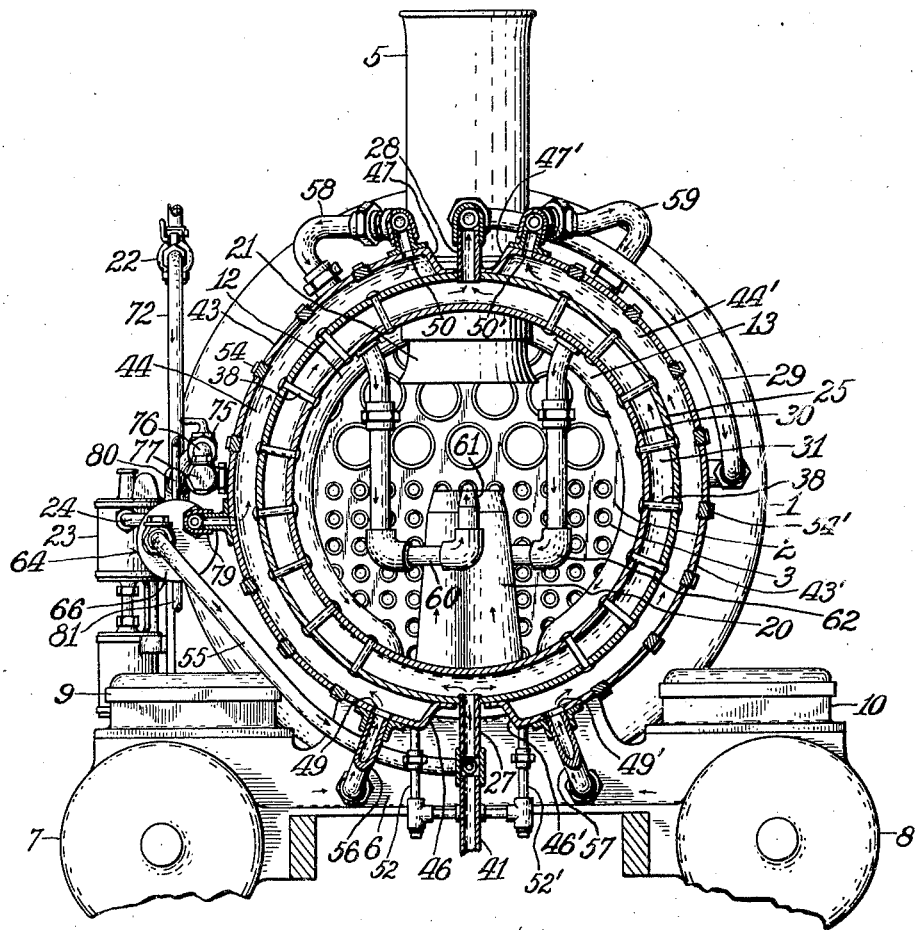
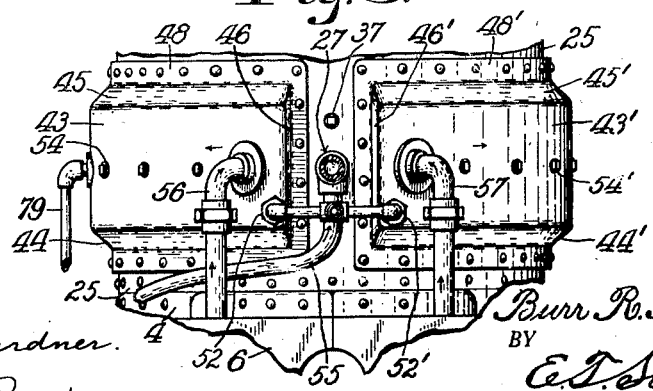
WITNESS:
J. H. Gardner
F. M. Roeder
INVENTOR:
Burr R. Skinner,
BY
E. T. Silvius,
ATTORNEY.

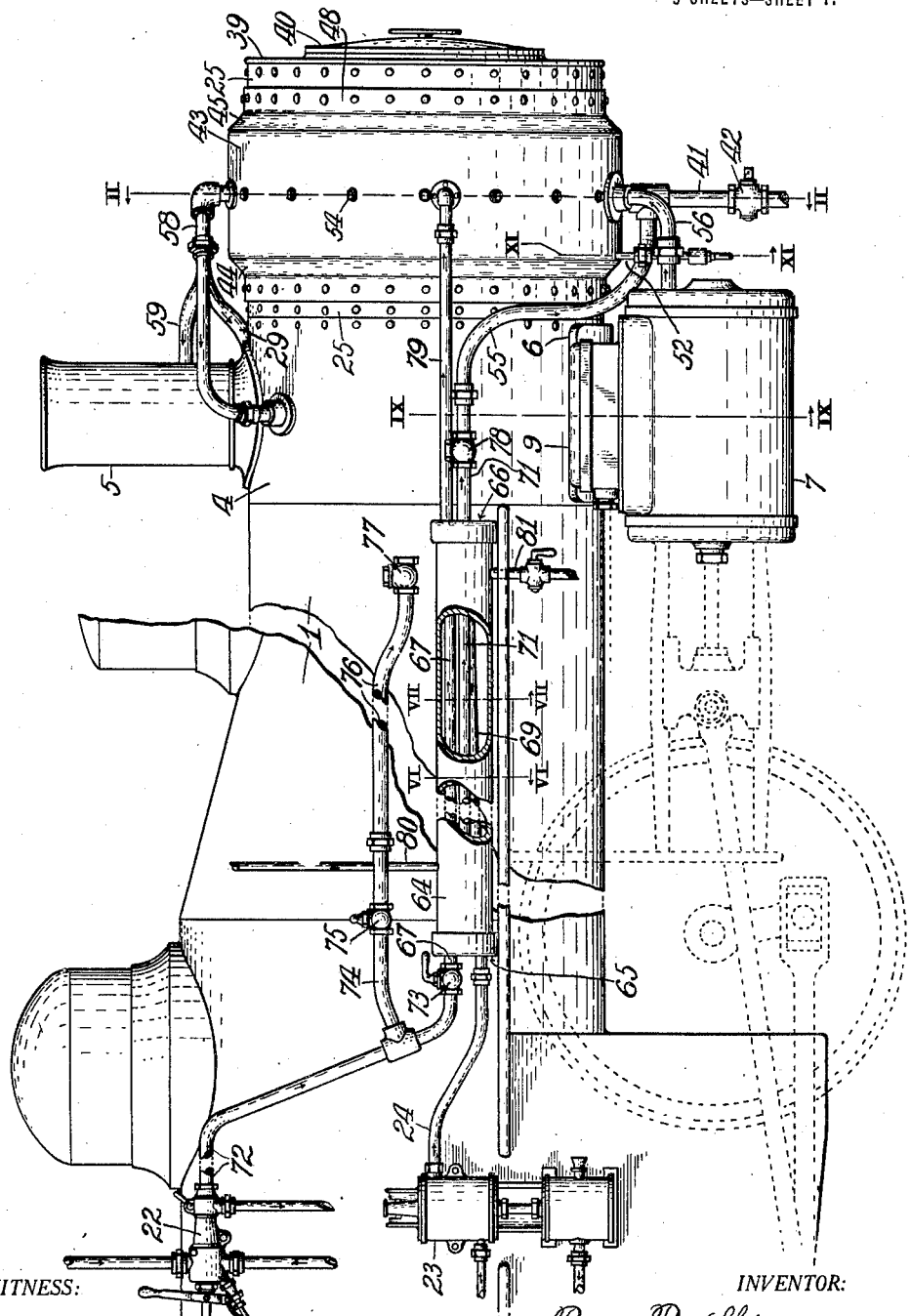

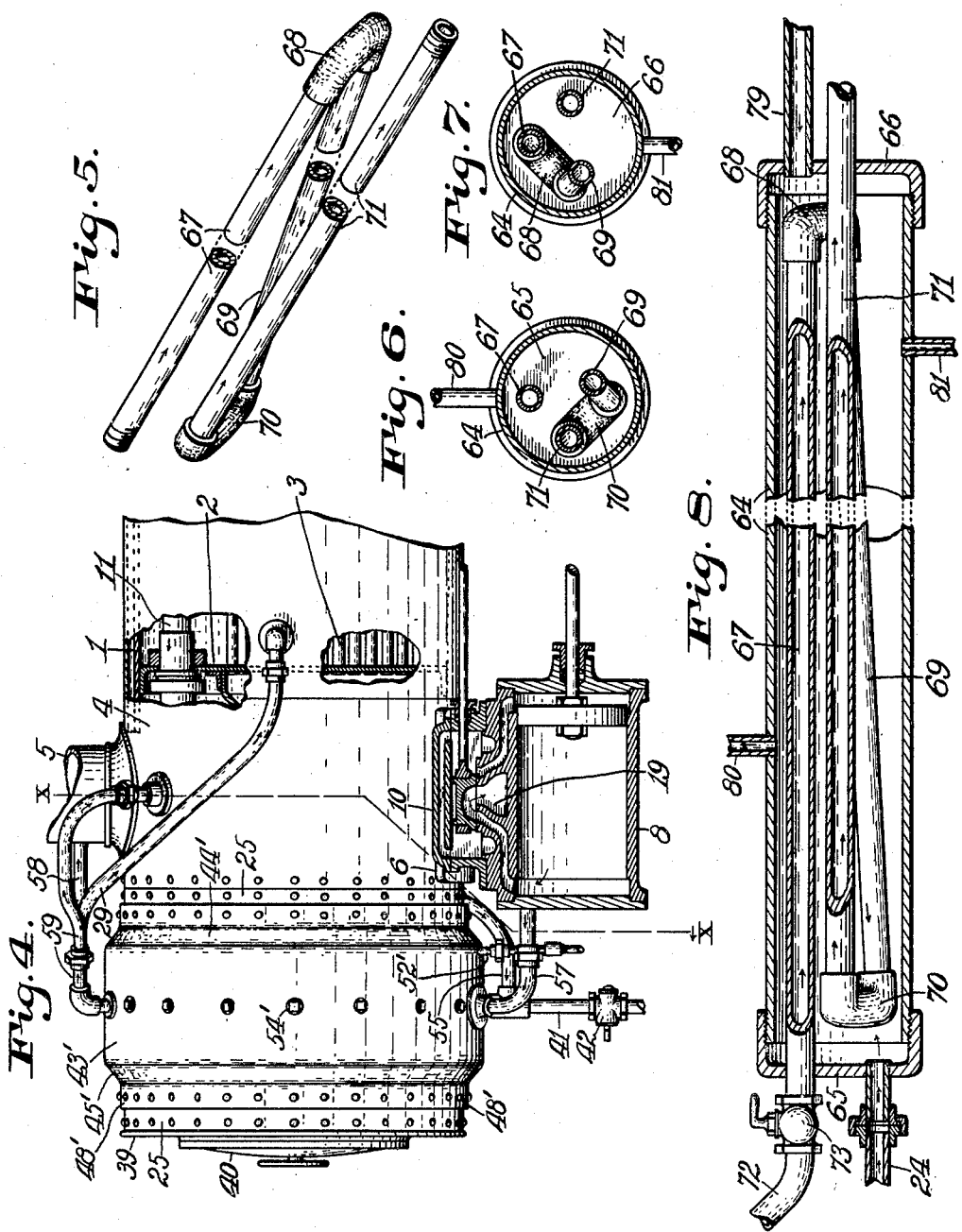

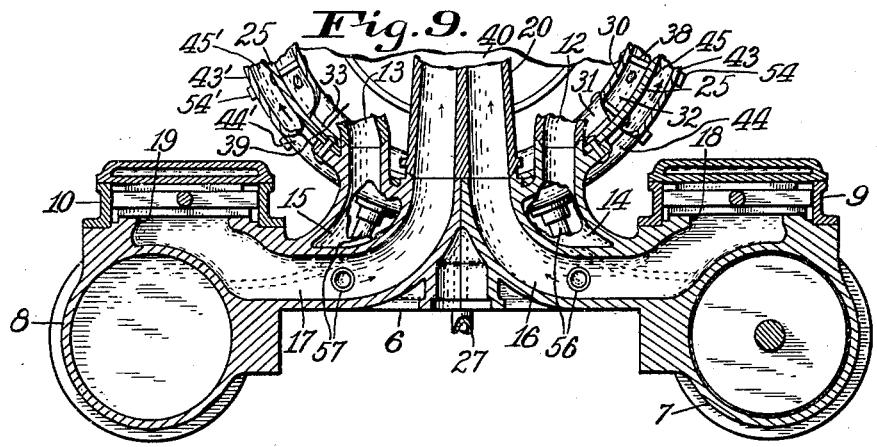
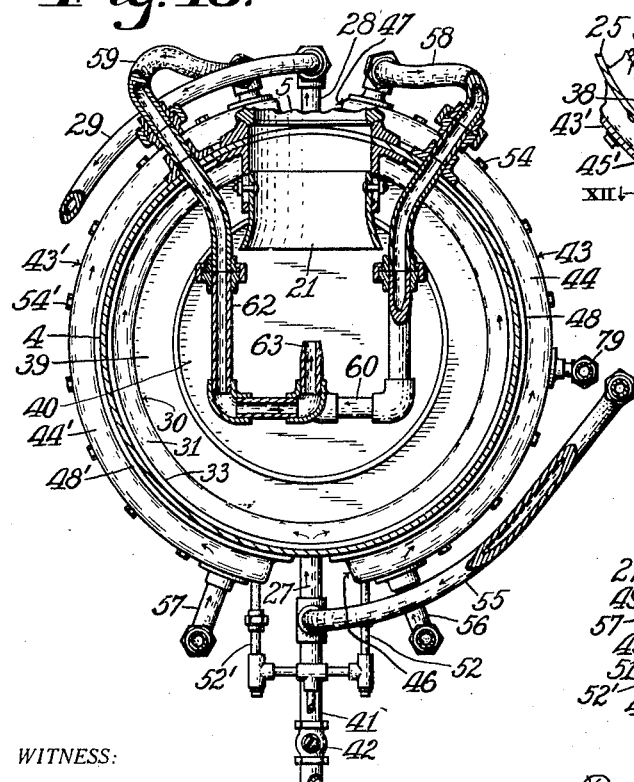
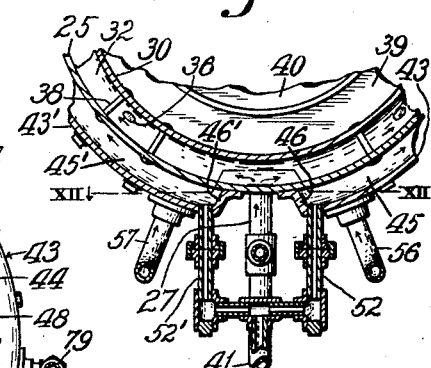
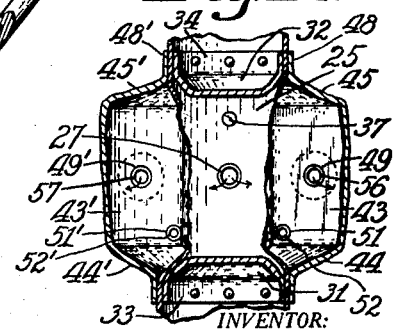

B. R. SKINNER.
MEANS FOR HEATING BOILER FEED WATER.
APPLICATION FILED JUNE 8, 1918.
1,341,443.
Patented May 25, 1920.
5 SHEETS—SHEET 5.
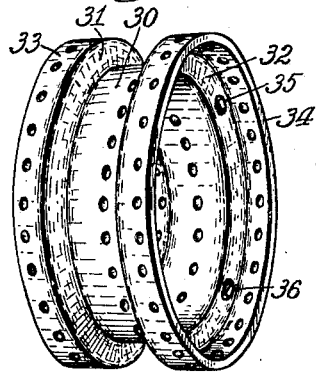
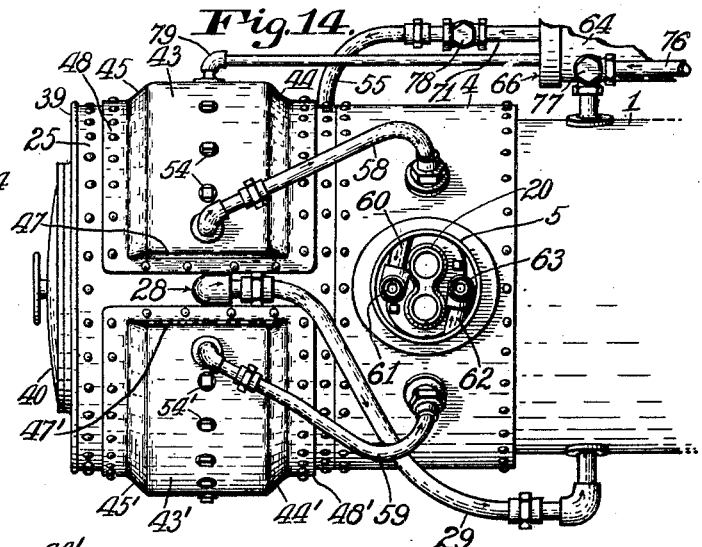
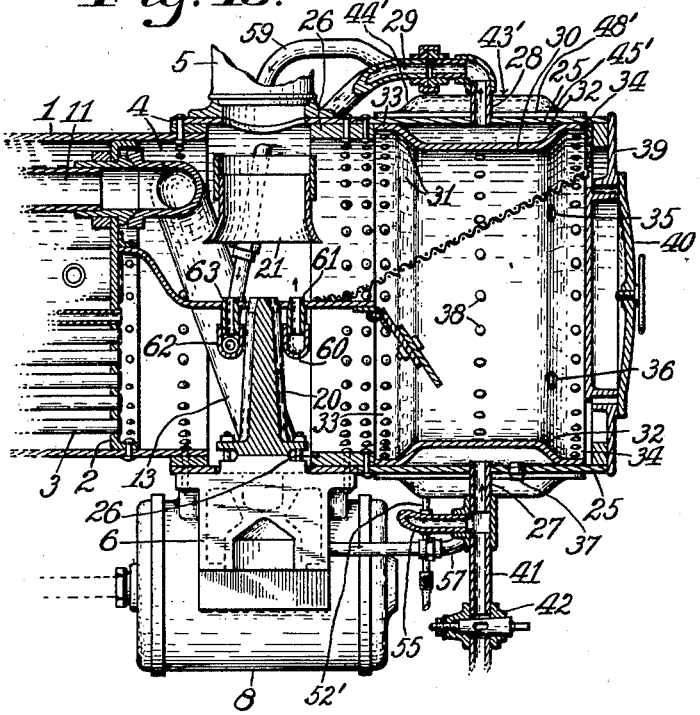
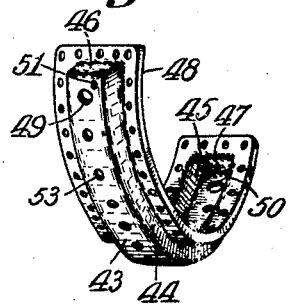
WITNESS:
J. H. Gardner.
F. M. Roeder.
INVENTOR:
Burr R. Skinner,
BY
E. T. Silvius,
ATTORNEY.

UNITED STATES PATENT OFFICE.

BURR R. SKINNER, OF ABERDEEN, SOUTH DAKOTA.

MEANS FOR HEATING BOILER FEED-WATER.

1,341,443.　　　　　Specification of Letters Patent.　　Patented May 25, 1920.

Application filed June 8, 1918. Serial No. 238,976.

*To all whom it may concern:*

Be it known that I, BURR R. SKINNER, a citizen of the United States, residing at Aberdeen, in the county of Brown and State of South Dakota, have invented a new and useful Improvement in Means for Heating Boiler Feed-Water, of which the following is a specification, reference being had to the accompanying drawings and to the letters and figures of reference marked thereon.

This invention relates to means for utilizing exhaust or waste steam for heating water or raising the temperature of water entering boilers to be further heated or to be converted into steam, the invention having reference more particularly to means for utilizing furnace-draft heat with the heat of spent steam for heating the feed-water required by steam-boilers, the invention having reference also to improvements in the apparatus described in Letters Patent granted to me on August 25, 1914, No. 1,108,633.

An object of the invention is to effect a greater saving of fuel required for heating water or converting water into steam.

Another object is to supply the boiler with water of the highest temperature possible in order that the temperature of the water may be raised in the boiler to the required degree with the minimum consumption of fuel and rapidly relatively to the size of the fire-box of the boiler, so that a boiler of given size may be enabled to generate steam more freely with consequent increase in capacity or power.

A further object is to provide improved means for heating feed-water for locomotive boilers that shall be so constructed as to be highly efficient yet simple and adapted to directly utilize exhaust steam from the engine cylinders, while tending to prevent sharp blasts from the exhaust nozzle and therefore prevent drawing unburned fuel from the furnace with consequent waste of fuel.

A still further object is to provide improved construction in means for heating boiler feed-water to permit production at minimum cost and also permit ready repairs, and whereby the exhaust steam not only from the engine cylinders but from the air-pump of the locomotive may be most advantageously utilized both for heating the feed-water and for creating the most advantageous furnace-draft, so as to obtain the most economical results in the consumption of fuel.

With the above-mentioned and other objects in view, the invention consists in an improved heater or auxiliary boiler connected with a steam boiler in a novel manner; and the invention consists also further in various novel features and parts, and in the combinations and arrangements thereof, as hereinafter particularly described and further set forth in the appended claims.

Referring to the drawings,—Figure 1 is a fragmentary right side elevation of a railway locomotive provided with the improved means for heating boiler feed-water, as illustrative of one form of structure for practically carrying out the objects of the invention; Fig. 2 is a transverse sectional elevation approximately on the line II—II in Fig. 1; Fig. 3 is a fragmentary bottom view of the feed-water heater structure; Fig. 4 is a fragmentary left side elevation of the locomotive to which the invention is applied, portions being broken away; Fig. 5 is a perspective view of a coil for primarily heating the feed-water; Fig. 6 is a section approximately on the line VI—VI in Fig. 1; Fig. 7 is a section approximately on the line VII—VII in Fig. 1; Fig. 8 is a longitudinal sectional elevation of the primary feed-water heater comprised in the invention; Fig. 9 is a fragmentary sectional elevation approximately on the line IX—IX in Fig. 1, portions being broken away; Fig. 10 is a sectional elevation approximately on the line X—X in Fig. 4; Fig. 11 is a fragmentary sectional elevation approximately on the line XI—XI in Fig. 1; Fig. 12 is a fragmentary sectional plan approximately on the line XII—XII in Fig. 11; Fig. 13 is a perspective view of one of the principal parts of the heating boiler or feed-water heater; Fig. 14 is a fragmentary top view of the locomotive boiler and the feed-water heater; Fig. 15 is a vertical central longitudinal section of the improved heating boiler and a portion of the locomotive to which it is applied; and, Fig. 16 is a perspective view of another one of the principal parts of the auxiliary or heating boiler.

On the various figures of the drawings similar reference characters indicate corresponding elements or features of construction herein referred to in detail.

A well known type of locomotive will be briefly described as sufficient for an understanding of the relation of the invention thereto, the numeral 1 indicating the steam-boiler having a front flue sheet 2 and boiler flues or tubes 3, 4 the smoke-box, 5 the smoke-stack, 6 the saddle secured to the bottom of the smoke-box, 7 and 8 the engine cylinders provided respectively with valve chests 9 and 10, 11 the dry pipe or steam pipe in the boiler with which two branch pipes 12 and 13 are connected for conducting steam to the valve chests to be distributed to the cylinders. The saddle 6 has suitable ducts 14 and 15 to which the branch pipes 12 and 13 are respectively connected to conduct the steam to the valve chests, as will be understood. The saddle has also exhaust ducts or cavities 16 and 17 therein to receive the exhaust steam from the exhaust ports 18 and 19 extending from the valve chests 9 and 10, respectively, and discharge the exhaust steam into an exhaust pipe 20 from which the steam escapes through a draft pipe 21 into and through the smoke-stack 5. The exhaust pipe may be of the double nozzle or of the single nozzle type as may be preferred. An injector 22 is shown for supplying the locomotive boiler with water. The locomotive is provided with an air-pump 23 operated by steam and having an exhaust pipe 24 connected therewith. The locomotive boiler, engine elements and the attachments may be variously constructed.

It is well known that the products of combustion of fuel pass through the boiler tubes or flues into the smoke-box at high temperature, unburned fuel being carried also into the smoke-box when the exhaust blasts from the exhaust nozzles are violent, such fuel being wasted. With the improved construction such loss is reduced to the minimum and the heat of the escaping gases or product of combustion is utilized to the maximum extent for heating the feed-water during its passage to the locomotive boiler.

In the improved construction of the heating boiler a water-chamber is provided which is practically surrounded by a steam jacket which in the present case is composed of two steam-chambers or compartments, the heating boiler comprising specifically a main or partitional ring 25 that is cylindrical and secured to the smoke-box 4 as a forward extension thereof, preferably by means of a joint ring 26. The lower portion of the ring 25 is provided with an inlet nipple 27, the upper portion of the ring being provided with an outlet nipple 28 to which a discharge pipe 29 is connected that is connected also with the locomotive boiler 1 below the level of the water in the boiler. The ring 25 forms the outer wall of the water-chamber which in the present case is designed to be constantly full of water so that a relatively large volume shall be advantageously affected by the heat in the smoke-box. The inner ring or wall of the heating boiler comprises a cylindrical portion 30 that is less in diameter than the ring 25 and has end portions 31 and 32 formed thereon that extend outward to the inner side of the ring 25 to complete the water-chamber, said end portions having cylindrical extensions 33 and 34 respectively that are secured to the ring 25. The end portion 32 is provided with a suitable number of wash-out plugs 35, 36, and the lower portion of the ring 25 is provided with a wash-out plug 37. A suitable number of stay-bolts 38 are arranged in the water-chamber and secured to the ring 25 and the cylindrical portion 30 of the inner ring. The usual smoke-box front 39 is secured to the forward portion of the heating boiler and has the usual front door 40 thereon. A blow-off pipe 41 is provided for the water-chamber and preferably is connected with the inlet nipple 27 and provided with a blow-off cock 42.

An improvement is made in the construction of the steam jacket to insure the maximum benefit of the heat of the exhaust steam to raise the temperature of the feed-water, and to this end, instead of forming the steam-chamber continuously as heretofore, the steam-chamber is suitably divided into two compartments or passages, one receiving exhaust steam from one of the cylinders, the other separately receiving exhaust steam from the remaining one of the cylinders. One of the specific purposes of such division of the steam-chamber is to secure an increased number of exhaust blasts or discharges, which may be desired when the engine is working hard, instead of a practically continuous blow from a single steam-chamber. To obtain such advantages the outer wall of the steam jacket preferably is composed of two similar parts. One part of the outer wall comprises a curved main portion 43 formed as a segment of a cylindrical ring whose diameter is greater than the ring 25, said main portion having end portions 44 and 45 that extend inwardly and are arranged against the outside of the ring 25 to form a steam-chamber or compartment, said end portions having bottom and top portions 46 and 47 respectively to complete the wall of the chamber. A base portion 48 extends from the end portions and the bottom and top portions of the chamber and is secured to the outer side of one portion of the ring 25. The companion part similarly comprises a main portion 43', end portions 44' and 45' and also bottom portions and top portions 46' and 47' respectively to which a base portion 48' is connected that is secured to the opposite outside portion of the ring 25. Near the bottom portions 46 and 46′ the main portions 43 and 43′ have inlet apertures 49 and 49′ respectively, and the main portions have also outlet apertures 50 and 50′ adjacent to the top portions 47 and 47′ respectively. Also the lower portions have drain holes 51 and 51′ adjacent to the bottom portions 46 and 46′ respectively to which drain pipes 52 and 52′ are respectively connected. The main wall portions 43 and 43′ are provided with apertures 53 arranged opposite to the outer ends of the stay-bolts and are normally closed by plugs 54, 54′. A pipe 55 is connected with the inlet nipple 27 through which to feed the water required into the water-chamber to be conducted thence through the pipe 29 into the locomotive boiler.

For separately supplying the two compartments of the steam jacket when the locomotive is working, two pipes 56 and 57 are connected with the exhaust passages 16 and 17 respectively and also with the inlet apertures 49 and 49′ respectively. For permitting the exhaust steam after passing through the chambers to escape therefrom, two exhaust pipes 58 and 59 are connected with the outlet apertures 50 and 50′ respectively and extend to suitable openings in the upper portion of the smoke-box 4. An exhaust pipe 60 is arranged in the smoke-box and connected with the pipe 58, being shaped so as to extend to the exhaust pipe 20 and having an upturned exhaust nozzle 61 thereon preferably adjacent to the front side of the exhaust pipe 20. A similar exhaust pipe 62 is connected with the exhaust pipe 59 and extends to the opposite side of the exhaust pipe 20, being provided with an upturned nozzle 63. Such arrangement tends to avoid causing back pressure in the engine cylinders, since the exhaust steam from each cylinder is separately discharged into the smoke-stack.

For the purpose of obtaining the maximum benefit from the exhaust steam a primary heater is provided to raise the temperature of the feed-water in its passage to the main heater above described, the primary heater being adapted to be available when the air-pump is operating and the locomotive is not working, and also available to a greater degree of efficiency when the locomotive is working, and without requiring any manipulation or control of an attendant. The primary heater comprises a cylindrical shell 64 having heads 65 and 66 thereon so as to constitute a steam-chamber. A pipe coil is arranged in the shell 64 and comprises an inlet pipe 67 to which is connected a suitable return elbow 68 arranged adjacent to the head 66, the pipe 67 extending through the head 65, a return pipe 69 connected with the elbow, a suitable return elbow 70 connected to the pipe 69 and arranged adjacent to the head 65, and an outlet pipe 71 connected to the elbow 70 and extending through the head 66. A feed-pipe 72 is connected with the injector 22 and is suitably connected with the pipe 67, in the present case a stop cock 73 preferably being connected with the pipes 67 and 72, in which case a branch pipe section 74 is connected with the feed-pipe 72 and has a stop cock 75 connected thereto to which a branch pipe section 76 is connected, the latter being connected with a check valve 77 that is connected with the boiler 1 so that, if for any reason it is desired or necessary, the boiler may be supplied directly from the injector. The exhaust pipe 24 of the air-pump is connected to the head 65 so as to discharge into the shell 64. Outside of the shell a check valve 78 is connected with the pipe 71 and also with the pipe 55 to prevent the feed-water from being forced from the boiler 1 back to the injector. A connecting pipe 79 is connected with the head 66 and also with the main portion 43 of the wall of one of the steam-chambers of the main heater, so that steam may pass in either direction through the pipe. The upper portion of the shell 64 preferably has a vent pipe 80 connected thereto, a drain pipe 81 being connected with the lower portion of the shell.

In practical use the injector is operated to maintain the water in the steam boiler at the proper level, the remaining space in the upper portion of the steam boiler being occupied by steam under pressure. The water passes from the injector through the coil in the primary heater shell and thence through the inlet nipple 27, the water flowing out through the outlet nipple 28 and thence through the pipe 29 and into the steam boiler. When operating the engine the exhaust steam from the cylinders passes as usual through the exhaust pipe 20 and out through the smoke-stack, but some of the steam in its passage enters the apertures 49 and 49′ and escapes through the apertures 50 and 50′ and finally out of the nozzles 61 and 63. Thus the steam is compelled to encircle nearly the entire outer wall or ring 25 of the water-chamber and impart its heat nearly uniformly to the water within the water-chamber. The blasts of the escaping steam are moderate but frequent, so that while creating sufficient draft to insure proper combustion of fuel the pulling of unburned fuel into the smoke-box is reduced to the minimum while the heat to which the inner wall of the water chamber is subjected is available for heating the feed-water. Some of the exhaust steam passing through one of the steam chambers passes through the connecting pipe 79 and into the shell of the primary heater and thence out of the vent pipe 80 to raise the temperature of the feed-water before it reaches the main heater or heating boiler, such action taking place more particularly when the air-pump is not in operation. When the locomotive is not in operation the air-pump may be operated and at such time it may be necessary to feed the boiler, the feed-water temperature being raised by the exhaust steam from the air-pump escaping through the pipe 79 and through one of the steam-chambers where the heat remaining in the exhaust steam may be imparted to the feed-water in the water chamber. Under some circumstances the feed-water temperature may not be raised in the primary heater but may be prevented from being lowered in its passage. The benefits derived from heating the feed-water before it enters the steam boiler are well known, and the advantages arising from the inexpensive manner of heating the feed-water in the saving of fuel is considerable.

Having thus described the invention, what is claimed as new is—

1. A steam-boiler provided with a smoke-box having a heating boiler thereon comprising a continuous water-chamber, and two separate reversely arranged steam-chambers each extending from the lower portion to and terminating at the upper portion of the outside of the water-chamber.

2. Means for heating feed-water including a water-chamber, two steam-chambers, a heater shell having free communication with one of the steam-chambers, and a feed-pipe extending through the shell and between the two steam-chambers to the water-chamber.

3. Means for heating feed-water including a water-chamber, a steam-chamber on the outside of the water-chamber, a primary heater shell having free communication with the steam-chamber, and a feed-pipe extending tortuously through the heater shell and to the water-chamber clear of the steam-chamber.

4. Means for heating feed-water including an annular water-chamber and a transversely divided steam-jacket on the outside of the water-chamber to form two curved and reversely arranged steam-passages, the water-chamber having an inlet and an outlet, each steam-passage having a separate inlet and an outlet.

5. A steam-boiler provided with an annular heating boiler having a water-chamber and two steam-passages on the outside of the water-chamber, each steam-passage terminating adjacent to the top of the water-chamber, and a conduit connected with the upper portion of the water-chamber and also with the steam-boiler.

6. Means for heating feed-water including a primary heater, a main heater, a feed-pipe extending tortuously through the primary heater to the main heater, and a connecting pipe for conducting steam either from the primary heater to the main heater or from the main heater to the outside of the tortuous feed-pipe in the primary heater.

7. Means for heating feed-water including a primary heater, a main heater, a feed-pipe extending through the primary heater to the main heater, and two sources of steam-supply for the main heater connected therewith, one of the two sources having a conduit leading through the primary heater to the main heater.

8. A steam-boiler having a smoke-box provided with a water-chamber and two segmental reversely arranged steam-chambers, the water-chamber being annular and having communication with the steam-boiler, each steam-chamber having an inlet, a feed-pipe connected with the lower middle portion of the water-chamber, and two exhaust pipes connected with the upper portions of the steam-chambers respectively and extending separately into the smoke-box.

9. Means for heating feed-water including a heating boiler having a water-chamber and a steam-chamber, a steam-conduit extending to the steam-chamber, a primary heater shell, a feed-pipe extending through the heater shell and to the water-chamber, a steam-supply pipe extending into the heater shell, and a connecting pipe having communication with the interior of the heater shell and also with the steam-chamber of the heating boiler.

10. A steam-boiler having a smoke-box provided with an annular water-chamber having communication with the steam-boiler, the water-chamber having two separate reversely arranged segmental steam-chambers on the outside thereof, two steam-outlet conduits connected with the upper portions of the steam-chambers respectively, and a feed-pipe connected with the lower portion of the water-chamber and provided with a primary heater having communication with one of the two steam-chambers.

11. A steam-boiler provided with a water-heater having a water-chamber and two separate steam-chambers, each steam-chamber having an inlet and an outlet, a conduit connected with the water-chamber and the steam-boiler, a casing, a feed-pipe extending through the casing to the water-chamber, a steam-supply pipe connected with the casing, and a clear connecting pipe connected with the casing and one of the steam-chambers.

12. Means for heating feed-water including a water-chamber, a steam-chamber having an inlet and an outlet, an outlet pipe connected with the water-chamber, a casing, a pipe coil in the casing, a feed-pipe connected with one end of the coil, a branch pipe connected with the opposite end of the coil and also with the water-chamber, a steam-supply pipe connected with the casing, and a clear connecting pipe connected with the casing and the steam-chamber.

13. In means for heating boiler feed-water, the combination with a steam-boiler, a main heater, a primary heater, and an injector, of a feed-pipe connected to the injector and extending through the primary heater to the main heater, and a branch pipe connected with the feed-pipe between the injector and the primary heater and extending to the steam-boiler.

14. In means for heating boiler feed-water, the combination with an annular water-chamber, of two separate steam-chambers reversely arranged separately and apart on opposite sides respectively of the water-chamber and having each an inlet and an outlet, a feed-pipe connected with the lower middle portion of the water-chamber between the lower portions of the steam-chambers, and an outlet pipe connected with the water-chamber.

15. In means for heating boiler feed-water, the combination of a water-chamber, a steam-chamber, a casing with two heads, a pipe coil in the casing to conduct feed-water therethrough, said coil having connection with the water-chamber, a pipe connected to one of said heads to conduct steam into the casing, a pipe connected with the steam-chamber and also to the remaining one of said heads to conduct steam into the casing, and a vent-pipe connected to the casing.

16. In means for heating boiler feed-water, the combination with an annular water-chamber, of two separate steam-chambers reversely arranged separately and apart on opposite sides respectively of the water-chamber and having each an inlet at its bottom and an outlet at its top, a feed-pipe connected with the water-chamber, and an outlet pipe connected with the water-chamber between the upper portions of the two steam-chambers.

17. In means for heating boiler feed-water, a heating boiler including an annular inner chamber and two steam-chambers spaced apart on the outside of two opposite portions of the inner chamber, the inner chamber having an inlet between the normal lower ends of the steam-chambers and having also an outlet between the upper ends of the steam-chambers, each steam-chamber having an inlet adjacent to its lower end and an outlet adjacent to its upper end.

18. In means for heating boiler feed-water, the combination with a main ring, and an inner ring having end portions connected to the inside of the main ring, of an outer ring comprising two ring segments, each segment having a curved wall portion and two end portions and also a bottom portion and a top portion, and a base portion connected to said bottom and top and end portions, said base portions being secured to the outside of opposite portions of said main ring.

19. In means for heating boiler feed-water, a heating boiler comprising a main ring, an inner ring having end portions connected to the main ring, one of said end portions being provided with a wash-out plug, two outer ring segments having each a wall portion and also end portions and bottom and top portions having a base portion thereon, said base portions being arranged on the outside of the main ring and secured thereto, and a wash-out plug connected to said main ring between the bottom portions of said segments.

20. In means for heating boiler feed-water, the combination of a main heater having two reversely arranged and separated segmental steam-chambers, a water-chamber arranged on the inner side of the steam-chambers, a casing having free communication with one of said steam-chambers, a feed-pipe extending through the casing to the water-chamber, an outlet pipe connected with the water-chamber, a steam-supply pipe connected with the casing, two supply pipes connected with the steam-chambers respectively, and two exhaust pipes connected with the tops of the steam-chambers respectively and extending each approximately to the other.

21. In means for heating boiler feed-water, the combination with a steam boiler, of a smoke-box having an extension on its end provided on its inside with a water-chamber and on its outside with two separate steam-chambers, an inlet pipe connected with the water-chamber between the bottoms of the two steam-chambers, a conduit connected with the water-chamber between the tops of the two steam-chambers, two supply pipes connected with the lower portion of the steam-chambers respectively, and two exhaust pipes connected with the upper portion of the steam-chambers respectively and extending into the smoke-box.

22. In means for heating boiler feed-water, the combination with a steam-boiler, a boiler-feeder, and a steam-operated pump, of a water-heating boiler having a water-chamber and also two separated and reversely arranged steam-chambers, a feed-pipe connected with the boiler-feeder and the lower portion of the water-chamber between the two steam-chambers, an exhaust steam-pipe having connection with the pump and one of the steam-chambers, two outlet pipes connected with the tops of the steam-chambers respectively, two inlet pipes connected with the steam-chambers respectively, and a connecting conduit connected with the top of the water-chamber and also with the steam-boiler.

23. In means for heating boiler feed-water, the combination of a smoke-box having two steam-chambers on its outside, a water-chamber on the inside of the smoke-box, a casing, a feed-pipe extending through the casing and to the bottom of the water-chamber between the steam-chambers, a steam-pipe connected with the casing, a clear connecting pipe connected with the casing and one of the steam-chambers, an outlet pipe connected with the water-chamber between the steam chambers, two supply pipes connected with the steam-chambers respectively, and two exhaust pipes connected with the steam-chambers respectively and extending into the smoke-box, the exhaust pipes having nozzles arranged in proximity each to the other.

In testimony whereof I affix my signature in presence of two witnesses.

BURR R. SKINNER.

Witnesses:
JNO. L. RUCKMAN,
J. H. POND.